(12) United States Patent
Bloxham et al.

(10) Patent No.: US 9,816,390 B2
(45) Date of Patent: Nov. 14, 2017

(54) ELECTRIC ACTUATOR FOR ENGINE CONTROL

(71) Applicant: Hamilton Sundstrand Corporation, Windsor Locks, CT (US)

(72) Inventors: Keith Bloxham, Gilbert, AZ (US); Derick S. Balsiger, Mayer, AZ (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 399 days.

(21) Appl. No.: 14/789,218

(22) Filed: Jul. 1, 2015

(65) Prior Publication Data
US 2017/0002679 A1    Jan. 5, 2017

(51) Int. Cl.
F01D 17/14    (2006.01)
F01D 17/02    (2006.01)
(Continued)

(52) U.S. Cl.
CPC ............... *F01D 17/14* (2013.01); *F01D 9/02* (2013.01); *F01D 15/12* (2013.01); *F01D 17/02* (2013.01); *F01D 17/162* (2013.01); *F01D 17/20* (2013.01); *F02C 7/20* (2013.01); *F05D 2220/32* (2013.01); *F05D 2230/60* (2013.01);
(Continued)

(58) Field of Classification Search
CPC . F01D 17/14; F01D 9/02; F01D 15/12; F01D 17/162; F01D 17/02; F01D 17/20; F02C 7/20; F05D 2240/60; F05D 2270/62; F05D 2220/32; F05D 2230/60; F05D 2240/128; F05D 2250/90; F05D 2260/40
See application file for complete search history.

(56) References Cited

U.S. PATENT DOCUMENTS 3,146,585 A    9/1964    Gulick
3,377,799 A *  4/1968   Geyer ..................... F01D 17/20
                                                          415/13
(Continued)

FOREIGN PATENT DOCUMENTS

EP         2574733         4/2013
WO    2014197089 A2    12/2014

OTHER PUBLICATIONS

EP Application No. 16177537.4 Extended European Search Report dated Nov. 17, 2016, 8 pages.

*Primary Examiner* — Gregory Anderson
*Assistant Examiner* — Eldon Brockman
(74) *Attorney, Agent, or Firm* — Cantor Colburn LLP

(57) ABSTRACT

An electric actuator for control of an engine includes an electric motor coupled to a drive shaft that extends to align a gear interface of the electric actuator with a variable geometry adjustment interface of the engine. A position feedback shaft extends coaxially with respect to the drive shaft. The position feedback shaft is coupled to an output shaft of the gear interface at a gear interface end of the position feedback shaft. A rotational position sensor is coupled to a motor end of the position feedback shaft proximate the electric motor. The drive shaft and the position feedback shaft are sized to position an output ring gear of the output shaft in contact with the variable geometry adjustment interface within a casing of the engine and to further position the electric motor and the rotational position sensor external to the casing of the engine.

20 Claims, 3 Drawing Sheets

(51) Int. Cl.
*F01D 17/16* (2006.01)
*F01D 17/20* (2006.01)
*F02C 7/20* (2006.01)
*F01D 9/02* (2006.01)
*F01D 15/12* (2006.01)

(52) U.S. Cl.
CPC .... *F05D 2240/128* (2013.01); *F05D 2240/60* (2013.01); *F05D 2250/90* (2013.01); *F05D 2260/40* (2013.01); *F05D 2270/62* (2013.01)

(56) References Cited

U.S. PATENT DOCUMENTS

| | | | | |
|---|---|---|---|---|
| 3,628,329 A | * | 12/1971 | Spencer | F01D 17/162 137/457 |
| 5,035,572 A | * | 7/1991 | Popp | F01D 17/162 415/12 |
| 9,394,804 B2 | * | 7/2016 | Rusovici | F01D 17/162 |
| 2010/0290889 A1 | | 11/2010 | Fedor | |
| 2014/0169948 A1 | | 6/2014 | Kay et al. | |

* cited by examiner

US 9,816,390 B2

ELECTRIC ACTUATOR FOR ENGINE CONTROL

BACKGROUND

The present disclosure generally relates to actuation systems and, more particularly, to an electric actuator for gas turbine engine control.

To optimize performance of a gas turbine engine, the internal geometry of the engine or a high-temperature flow path of the engine may be adjusted during operation. The extreme high-temperature environment of an engine core or a downstream flow path from the engine core is not well suited to electric actuation, as electric components may overheat and cease operation (e.g., at temperatures above 350 degrees F. or about 176 degrees C.). Actuation systems that require a high degree of accuracy in position and/or velocity feedback may experience reduced accuracy when position and/or velocity feedback is derived through a gearbox due to linkage torsion, gear stiffness, shaft stiffness, and the like. Reduced accuracy resulting from mechanical interactions can impede localized loop closure for actuation systems, which can be manifested in reduced actuation bandwidth and responsiveness.

BRIEF DESCRIPTION

According to one embodiment, an electric actuator for control of an engine includes an electric motor coupled to a drive shaft that extends to align a gear interface of the electric actuator with a variable geometry adjustment interface of the engine. A position feedback shaft extends coaxially with respect to the drive shaft. The position feedback shaft is coupled to an output shaft of the gear interface at a gear interface end of the position feedback shaft. A rotational position sensor is coupled to a motor end of the position feedback shaft proximate the electric motor. The drive shaft and the position feedback shaft are sized to position an output ring gear of the output shaft in contact with the variable geometry adjustment interface within a casing of the engine and to further position the electric motor and the rotational position sensor external to the casing of the engine.

According to another embodiment, an electric actuation system for an engine includes a first electric actuator and a second electric actuator. The first electric actuator includes a first electric motor coupled to a first drive shaft that extends to align a first gear interface of the first electric actuator with a variable geometry adjustment interface of the engine. A first position feedback shaft extends coaxially with respect to the first drive shaft. The first position feedback shaft is coupled to a first output shaft of the first gear interface at a first gear interface end of the first position feedback shaft. A first rotational position sensor is coupled to a first motor end of the first position feedback shaft proximate the first electric motor. The first drive shaft and the first position feedback shaft are sized to position a first output ring gear of the first output shaft in contact with the variable geometry adjustment interface within a casing of the engine and to further position the first electric motor and the first rotational position sensor external to the casing of the engine. The second electric actuator includes a second electric motor coupled to a second drive shaft that extends to align a second gear interface of the second electric actuator with the variable geometry adjustment interface of the engine. A second position feedback shaft extends coaxially with respect to the second drive shaft. The second position feedback shaft is coupled to a second output shaft of the second gear interface at a second gear interface end of the second position feedback shaft. A second rotational position sensor is coupled to a second motor end of the second position feedback shaft proximate the second electric motor. The second drive shaft and the second position feedback shaft are sized to position a second output ring gear of the second output shaft in contact with the variable geometry adjustment interface within the casing of the engine and to further position the second electric motor and the second rotational position sensor external to the casing of the engine.

A method of installing an electric actuator in an engine includes positioning a gear interface of the electric actuator within a casing of the engine such that an output ring gear of an output shaft of the gear interface contacts a variable geometry adjustment interface of the engine. A drive shaft and a position feedback shaft are passed through the casing, where the position feedback shaft is concentrically positioned within the drive shaft. An electric motor and a rotational position sensor are positioned external to the casing of the engine. The electric motor is coupled to the drive shaft to drive rotation of the gear interface, the rotational position sensor is coupled to a motor end of the position feedback shaft proximate the electric motor, and the position feedback shaft is coupled to the output shaft of the gear interface at a gear interface end of the position feedback shaft.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
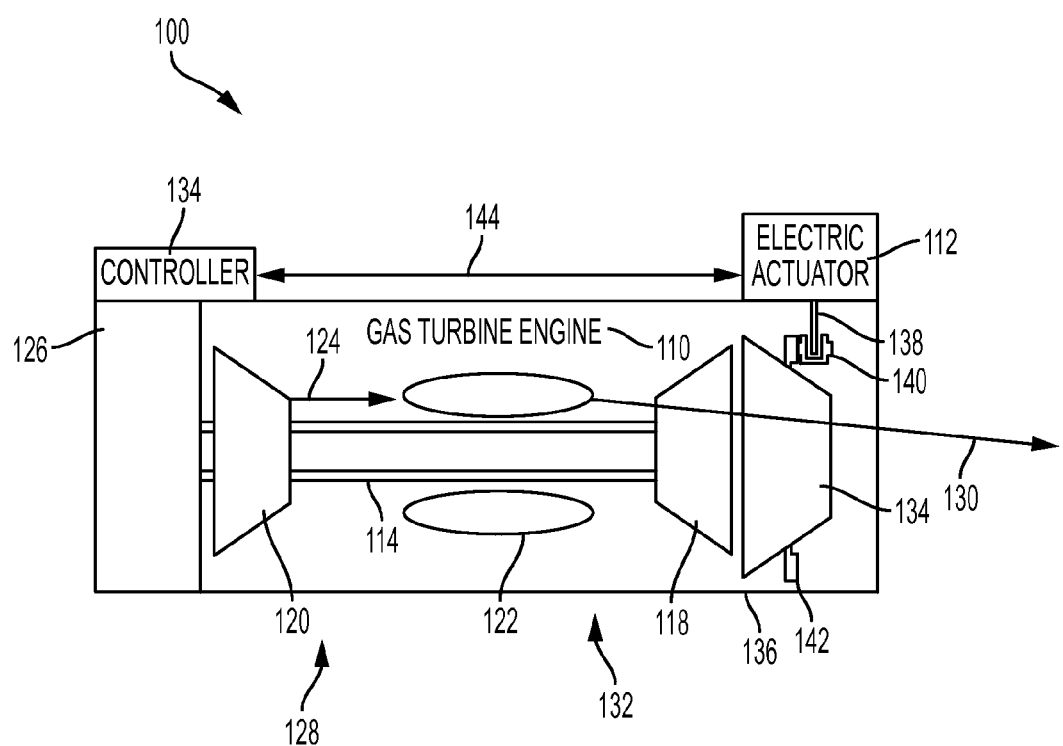
FIG. 1 depicts an engine system according to an embodiment.

Referring now to FIG. 1, engine system 100 includes a gas turbine engine 110 (also referred to as engine 110) that is an example of an engine in which electric actuator 112 can be installed according to an embodiment. The gas turbine engine 110 can be mobile or mounted for stationary operation. For instance, the engine system 100 can be part of a vehicle operable on ground, water, or in the air. Examples can include a car, bus, train, truck, tank, boat, aircraft, etc. In a stationary configuration, the engine system 100 can be a portion of a power plant. While the example engine system 100 only depicts a single instance of the gas turbine engine 110, it will be understood that the engine system 100 can include multiple instances of the gas turbine engine 110, such as in a multi-engine aircraft.

The gas turbine engine 110 can include a shaft 114 that is a spool upon which a turbine 118 and a compressor 120 are mounted. A combustor 122 is a heat source disposed between the turbine 118 and the compressor 120. The combustor 122 is operable to heat compressed gas 124 exiting the compressor 120 to increase energy in the compressed gas 124 prior to entering the turbine 118. The turbine 118 in turn drives the shaft 114 to rotate. In some embodiments, the gas turbine engine 110 can include multiple compressor and turbine stages. The turbine 118 can also drive rotation of a fan 126 directly via shaft 114 or through a gearbox (not depicted).

The fan 126 and compressor 120 are referred to collectively as a cool section 128 of the gas turbine engine 110, while the combustor 122 and components of the gas turbine engine 110 that are in a flow path 130 axially downstream of the combustor 122 are referred to as a hot section 132 of the gas turbine engine 110. For example, the hot section 132 can include the combustor 122, turbine 118, and nozzle 134. Electronics, such as electric motors and controls, typically cannot handle the high temperature environment of the hot section 132. For instance, a controller 134, such as a full authority digital engine control, is typically located outside of a casing 136 of the gas turbine engine 110 and proximate to the fan 126 in the cool section 128. In the hot section 132, temperatures within the casing 136 can exceed 350 degrees F. (about 176 degrees C.).

The electric actuator 112 is installed in the hot section 132 external to the casing 136, where temperatures are typically less than 350 degrees F. (about 176 degrees C.). The electric actuator 112 includes a shaft assembly 138 that extends to align a gear interface 140 of the electric actuator 112 with a variable geometry adjustment interface 142 of the gas turbine engine 110. In the example of FIG. 1, the variable geometry adjustment interface 142 is driven by the electric actuator 112 through the gear interface 140 to adjust geometry, e.g., the area, through which flow path 130 travels downstream of the combustor 122. The variable geometry adjustment interface 142 can be incorporated in various locations in the hot section 132, but in the example of FIG. 1, the variable geometry adjustment interface 142 adjusts flow area of the nozzle 134. Alternatively, the variable geometry adjustment interface 142 can be integrated as part of the turbine 118 or installed upstream or downstream of the turbine 118. The variable geometry adjustment interface 142 may be an engine synchronization ring that converts rotational motion into a change in area through which the flow path 130 flows prior to exiting the gas turbine engine 110.

The electric actuator 112 can be controlled by the controller 134 over one or more electrical busses 144 that may selectively control power provided to the electric actuator, control engagement and retraction of a portion of the gear interface 140, and feedback position information of the variable geometry adjustment interface 142. The controller 134 may include includes a processor, memory, and communication interface to control the electric actuator 112 and other aspects of the gas turbine engine 110, where memory of controller 134 can be implemented as a non-transitory computer readable storage medium tangibly embodied including executable instructions stored therein, for instance, as firmware.

Figure 2:
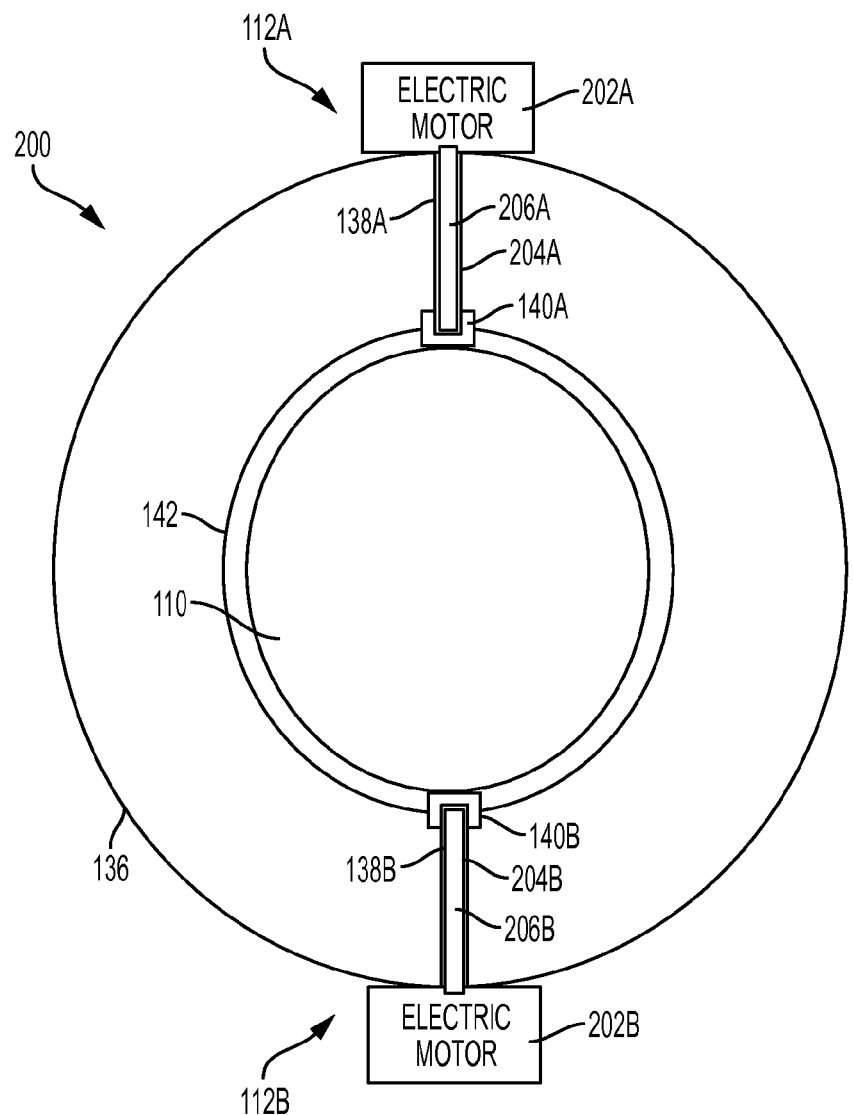
FIG. 2 depicts an electric actuation system for the engine system of FIG. 1 according to an embodiment.

FIG. 2 depicts an electric actuation system 200 for the gas turbine engine 110 of the engine system 100 of FIG. 1 according to an embodiment. The electric actuation system 200 includes a first electric actuator 112A and a second electric actuator 112B. The first electric actuator 112A includes a first electric motor 202A coupled to a first drive shaft 204A that extends to align a first gear interface 140A of the first electric actuator 112A with the variable geometry adjustment interface 142 of the gas turbine engine 110. A first position feedback shaft 206A extends coaxially with respect to the first drive shaft 204A. Shaft assembly 138A includes the first position feedback shaft 206A concentrically positioned within the first drive shaft 204A. As can be seen in FIG. 2, the first electric motor 202A is positioned external to the casing 136 of the gas turbine engine 110.

Similarly, the second electric actuator 112B includes a second electric motor 202B coupled to a second drive shaft 204B that extends to align a second gear interface 140B of the second electric actuator 112B with the variable geometry adjustment interface 142 of the gas turbine engine 110. A second position feedback shaft 206B extends coaxially with respect to the second drive shaft 204B. Shaft assembly 138B includes the second position feedback shaft 206B concentrically positioned within the second drive shaft 204B. Although only two electric actuators 112 are depicted in FIG. 2, it will be understood that the electric actuation system 200 can include any number of electric actuators 112 to drive motion of the variable geometry adjustment interface 142, and the electric actuators 112 can be distributed in any pattern about the variable geometry adjustment interface 142. Further details regarding common design elements of the first and second electric actuators 112A, 112B are provided in FIG. 3, where the common elements are described absent the first/second designations.

Figure 3:
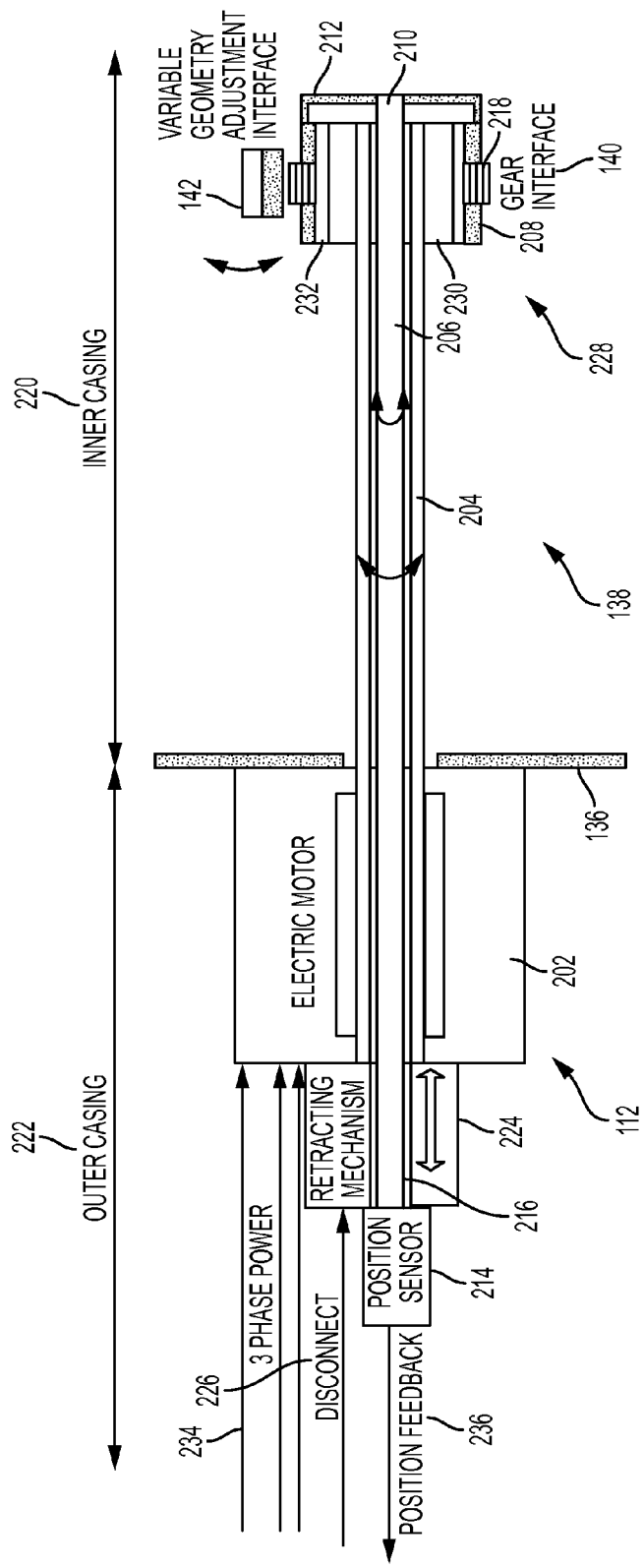
FIG. 3 depicts an electric actuator installed in the engine system of FIG. 1 according to an embodiment.

FIG. 3 depicts electric actuator 112 installed in the engine system 100 of FIG. 1 according to an embodiment. The electric actuator 112 for control of the gas turbine engine 110 of the engine system 100 of FIG. 1 includes electric motor 202 coupled to drive shaft 204 that extends to align gear interface 140 of the electric actuator 112 with variable geometry adjustment interface 142. Position feedback shaft 206 extends coaxially with respect to the drive shaft 204 in shaft assembly 138. The position feedback shaft 206 is coupled to an output shaft 208 of the gear interface 142 at a gear interface end 210 of the position feedback shaft 206, e.g., via a coupling linkage 212. A rotational position sensor 214, such as a rotary variable differential transformer (RVDT) or resolver, is coupled to a motor end 216 of the position feedback shaft 206 proximate the electric motor 202. The drive shaft 204 and the position feedback shaft 206 are sized to position an output ring gear 218 of the output shaft 208 in contact with the variable geometry adjustment interface 142 within the casing 136 of the gas turbine engine 110 of FIG. 1 (i.e., in inner casing region 220) and to further position the electric motor 202 and the rotational position sensor 214 external to the casing 136 (i.e., in outer casing region 222).

The electric actuator 112 can also include a retracting mechanism 224 configured to selectively retract the drive shaft 204 and a portion of the gear interface 140 to decouple the drive shaft 204 from the output shaft 208. Retracting mechanism 224 can be a disconnect solenoid configured to retract the drive shaft 204 in response to a disconnect instruction or command signal 226, for example, received on one or more electrical busses 144 from the controller 134 of FIG. 1. The gear interface 140 may be implemented as a harmonic drive 228 that includes a wave generator 230 operatively coupled to the drive shaft 204 and a flex gear 232 interposed between the wave generator 230 and the output shaft 208. When drive shaft 204 is retracted, the drive shaft 204 disengages and decouples from the harmonic drive 228. Once disengaged, energy from the drive shaft 204 is no longer transferred to output shaft 208, and thus the electric actuator 112 ceases to drive the variable geometry adjustment interface 142. Conversely, output shaft 208 can no longer transfer energy to the drive shaft 204. The retracting mechanism 224 may also be configured to move the drive shaft 204 back into its original position so as to engage/couple the drive shaft 204 to the harmonic drive 228 and allow energy to be transferred between the drive shaft 204 and output shaft 208. The wave generator 230 is an example of the portion of the gear interface 140 that decouples the drive shaft 204 from the output shaft 208.

The harmonic drive 228 can be implemented as using strain wave gearing. The drive shaft 204 can be connected to wave generator 230 such that if the drive shaft 204 moves axially, the wave generator 230 also moves axially. Wave generator 230 can have a cross section that is rectangular with semi-circles on each end. On the radially inner side of wave generator 230 is drive shaft 204 and on the radially outer side is flex gear 232. Between wave generator 230 and drive shaft 204 may be a lubricant to reduce friction and wear between wave generator 230 and flex gear 232 so as to improve durability and efficiency.

Flex gear 232 can have wave generator 230 on the radially inner side and output shaft 208 and output ring gear 218 on the radially outer side. Flex gear 232 may have a cross-section that is substantially oval or elliptical when wave generator 230 is radially within flex gear 232. Flex gear 232 can be smooth on the radially inner surface to allow for wave generator 230 to easily slide as wave generator 230 rotates and has teeth on the radially outer surface that, when rotated, fit into teeth on the inner surface of output ring gear 218. Flex gear 232 can be made from a flexible material, such as spring steel or another suitable material, to allow for flex gear 232 to take a shape similar to an oval when wave generator 230 is radially within flex gear 232. When wave generator 230 is radially within flex gear 232, only the smooth inner surface of flex gear 232 near the semi-circular ends of wave generator 230 may contact wave generator 230. As a result, only the teeth of flex gear 232 radially outward from the surface that are in contact with wave generator 230 may be in contact with output ring gear 218 at any one time, for flex gear 232 takes on a cross section that is substantially oval (i.e., a deformed state), while output ring gear 218 has a cross section that is substantially circular. As wave generator 230 rotates, wave generator 230 can slide within flex gear 232 so that flex gear 232 does not rotate at the same angular velocity as wave generator 230 (thus there is a gear reduction). Generally, while wave generator 230 rotates, flex gear 232 rotates at a slower angular velocity.

Output ring gear 218 is annular and has flex gear 232 on the radially inner side. Because output ring gear 218 is annular and flex gear 232 has a substantially oval cross-section when wave generator 230 is within flex gear 232, not all of the teeth on the radially inner surface of output ring gear 218 contact the teeth on flex gear 232 simultaneously.

In the retracted condition, the flex gear 232 can take on what is referred to herein as a "free state" due to the withdrawal of the wave generator 230. In the free state, the flex gear teeth and the ring gear teeth are completely disengaged from each other to form a clearance therebetween. By establishing a complete clearance between the flex gear teeth and the ring gear teeth, it is ensured that ratcheting between the flex gear 232 and the output ring gear 218 is avoided.

With respect to the gas turbine engine 110 of FIG. 1, the drive shaft 204 and the position feedback shaft 206 extend radially to align the gear interface 140 of the electric actuator 112 with the variable geometry adjustment interface 142, and the position feedback shaft 206 is concentrically positioned within the drive shaft 204. The variable geometry adjustment interface 142 is operable to adjust the geometry of flow path 130 of FIG. 1 axially downstream of combustor 122 of FIG. 1 in response to rotation of the output ring gear 218. The controller 134 of FIG. 1 can control distribution of power, such as three-phase power 234, to the electric motor 202 and can achieve loop closure using position feedback 236 from rotational position sensor 214 to control the variable geometry adjustment interface 142. Since electronics such as the electric motor 202, rotational position sensor 214, and retracting mechanism 224 are located in the outer casing region 222, the high temperature effects that would be present in the inner casing region 220 are avoided, such as reduced service life. The position feedback shaft 206 provides a direct mechanical link into the inner casing region 220 such that the rotational position sensor 214 can directly observe the position of output shaft 208 and thus precisely determine positioning of the variable geometry adjustment interface 142 without regard to the gearing interactions within the harmonic drive 228.

With respect to FIG. 2, the elements of FIG. 3 may be included with respective first and second designations in the first electric actuator 112A and second electric actuator 112B. For example, the first position feedback shaft 206A has a first gear interface end at the first gear interface 140A and a first motor end proximate the first electric motor 202A and is coupled to a first rotational position sensor. The first gear interface 140A includes a first output shaft, a first output ring gear, a first wave generator operatively coupled to the first drive shaft 204A, and a first flex gear interposed between the first wave generator and the first output shaft. The first electric actuator 112A can also include a first retracting mechanism configured to selectively retract the first drive shaft 204A and a portion of the first gear interface 140A to decouple the first drive shaft 204A from the first output shaft. Similarly, the second position feedback shaft 206B has a second gear interface end at the second gear interface 140B and a second motor end proximate the second electric motor 202B and is coupled to a second rotational position sensor. The second gear interface 140B includes a second output shaft, a second output ring gear, a second wave generator operatively coupled to the second drive shaft 204B, and a second flex gear interposed between the second wave generator and the second output shaft. The second electric actuator 112B can also include a second retracting mechanism configured to selectively retract the second drive shaft 204B and a portion of the second gear interface 140B to decouple the second drive shaft 204B from the second output shaft.

A process for installing an electric actuator in an engine is described in reference to FIGS. 1-3. The sequence of assembly during installation of the electric actuator 112 can vary in embodiments. The process includes positioning a gear interface 140 of the electric actuator 112 within a casing 136 of the engine 110 such that an output ring gear 218 of an output shaft 208 of the gear interface 140 contacts a variable geometry adjustment interface 142 of the engine 110. A drive shaft 204 and a position feedback shaft 206 are passed through the casing 136, where the position feedback shaft 206 is concentrically positioned within the drive shaft 204. An electric motor 202 and a rotational position sensor 214 are positioned external to the casing 136 of the engine 110. The electric motor 202 is coupled to the drive shaft 204 to drive rotation of the gear interface 140, the rotational position sensor 214 is coupled to a motor end 216 of the position feedback shaft 206 proximate the electric motor 202, and the position feedback shaft 206 is coupled to the output shaft 208 of the gear interface 140 at a gear interface end 210 of the position feedback shaft 206. The process can also include configuring a retracting mechanism 224 to selectively retract the drive shaft 204 and a portion of the gear interface 140 to decouple the drive shaft 204 from the output shaft 208. As previously described, the gear interface 140 may include a wave generator 230 operatively coupled to the drive shaft 204 and a flex gear 232 interposed between the wave generator 230 and the output shaft 208, where the flex gear 232 is configured to move between a deformed state and a free state, and the flex gear 232 is in the free state when the wave generator 230 is in a retracted condition. The variable geometry adjustment interface 142 is operable to adjust geometry of a flow path 130 axially downstream of a combustor 122 of the engine 110 in response to rotation of the output ring gear 218. The drive shaft 204 and the position feedback shaft 206 can extend radially to align the gear interface 140 of the electric actuator 112 with the variable geometry adjustment interface 142.

The terminology used herein is for the purpose of describing particular embodiments only and is not intended to be limiting. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An electric actuator for control of an engine, the electric actuator comprising:
    an electric motor coupled to a drive shaft that extends to align a gear interface of the electric actuator with a variable geometry adjustment interface of the engine;
    a position feedback shaft that extends coaxially with respect to the drive shaft, wherein the position feedback shaft is coupled to an output shaft of the gear interface at a gear interface end of the position feedback shaft; and
    a rotational position sensor coupled to a motor end of the position feedback shaft proximate the electric motor, wherein the drive shaft and the position feedback shaft are sized to position an output ring gear of the output shaft in contact with the variable geometry adjustment interface within a casing of the engine and to further position the electric motor and the rotational position sensor external to the casing of the engine.

2. The electric actuator according to claim 1, further comprising a retracting mechanism configured to selectively retract the drive shaft and a portion of the gear interface to decouple the drive shaft from the output shaft.

3. The electric actuator according to claim 2, wherein the gear interface further comprises a wave generator operatively coupled to the drive shaft and a flex gear interposed between the wave generator and the output shaft.

4. The electric actuator according to claim 3, wherein the flex gear is configured to move between a deformed state and a free state, and the flex gear is in the free state when the wave generator is in a retracted condition.

5. The electric actuator according to claim 2, wherein the retracting mechanism is a disconnect solenoid, and the wave generator is the portion of the gear interface.

6. The electric actuator according to claim 1, wherein the variable geometry adjustment interface is operable to adjust a flow path geometry axially downstream of a combustor of the engine in response to rotation of the output ring gear.

7. The electric actuator according to claim 6, wherein the drive shaft and the position feedback shaft extend radially to align the gear interface of the electric actuator with the variable geometry adjustment interface, and the position feedback shaft is concentrically positioned within the drive shaft.

8. An electric actuation system for an engine comprising:
    a first electric actuator comprising:
        a first electric motor coupled to a first drive shaft that extends to align a first gear interface of the first electric actuator with a variable geometry adjustment interface of the engine;
        a first position feedback shaft that extends coaxially with respect to the first drive shaft, wherein the first position feedback shaft is coupled to a first output shaft of the first gear interface at a first gear interface end of the first position feedback shaft; and
        a first rotational position sensor coupled to a first motor end of the first position feedback shaft proximate the first electric motor, wherein the first drive shaft and the first position feedback shaft are sized to position a first output ring gear of the first output shaft in contact with the variable geometry adjustment interface within a casing of the engine and to further position the first electric motor and the first rotational position sensor external to the casing of the engine; and
    a second electric actuator comprising:
        a second electric motor coupled to a second drive shaft that extends to align a second gear interface of the second electric actuator with the variable geometry adjustment interface of the engine;
        a second position feedback shaft that extends coaxially with respect to the second drive shaft, wherein the second position feedback shaft is coupled to a second output shaft of the second gear interface at a second gear interface end of the second position feedback shaft; and
        a second rotational position sensor coupled to a second motor end of the second position feedback shaft proximate the second electric motor, wherein the second drive shaft and the second position feedback shaft are sized to position a second output ring gear of the second output shaft in contact with the variable geometry adjustment interface within the casing of the engine and to further position the second electric motor and the second rotational position sensor external to the casing of the engine.

9. The electric actuation system according to claim 8, wherein the first electric actuator further comprises a first retracting mechanism configured to selectively retract the first drive shaft and a portion of the first gear interface to decouple the first drive shaft from the first output shaft; and the second electric actuator further comprises a second retracting mechanism configured to selectively retract the second drive shaft and a portion of the second gear interface to decouple the second drive shaft from the second output shaft.

10. The electric actuation system according to claim 9, wherein the first gear interface further comprises a first wave generator operatively coupled to the first drive shaft and a first flex gear interposed between the first wave generator and the first output shaft; and the second gear interface further comprises a second wave generator operatively coupled to the second drive shaft and a second flex gear interposed between the second wave generator and the second output shaft.

11. The electric actuation system according to claim 10, wherein the first flex gear and the second flex gear are configured to move between a deformed state and a free state, wherein the first flex gear is in the free state when the first wave generator is in a retracted condition, and the second flex gear is in the free state when the second wave generator is in the retracted condition.

12. The electric actuation system according to claim 9, wherein the first retracting mechanism and the second retracting mechanism are each a disconnect solenoid, the first wave generator is the portion of the first gear interface, and the second wave generator is the portion of the second gear interface.

13. The electric actuation system according to claim 8, wherein the variable geometry adjustment interface is operable to adjust a flow path geometry axially downstream of a combustor of the engine in response to rotation of one or more of the first output ring gear and the second output ring gear.

14. The electric actuation system according to claim 13, wherein the first drive shaft and the first position feedback shaft extend radially to align the first gear interface of the first electric actuator with the variable geometry adjustment interface; the first position feedback shaft is concentrically positioned within the first drive shaft; the second drive shaft and the second position feedback shaft extend radially to align the second gear interface of the second electric actuator with the variable geometry adjustment interface; and the second position feedback shaft is concentrically positioned within the second drive shaft.

15. A method of installing an electric actuator in an engine, comprising:
   positioning a gear interface of the electric actuator within a casing of the engine such that an output ring gear of an output shaft of the gear interface contacts a variable geometry adjustment interface of the engine;
   passing a drive shaft and a position feedback shaft through the casing, wherein the position feedback shaft is concentrically positioned within the drive shaft; and
   positioning an electric motor and a rotational position sensor external to the casing of the engine, wherein the electric motor is coupled to the drive shaft to drive rotation of the gear interface, the rotational position sensor is coupled to a motor end of the position feedback shaft proximate the electric motor, and the position feedback shaft is coupled to the output shaft of the gear interface at a gear interface end of the position feedback shaft.

16. The method according to claim 15, further comprising configuring a retracting mechanism to selectively retract the drive shaft and a portion of the gear interface to decouple the drive shaft from the output shaft.

17. The method according to claim 16, wherein the gear interface further comprises a wave generator operatively coupled to the drive shaft and a flex gear interposed between the wave generator and the output shaft.

18. The method according to claim 17, wherein the flex gear is configured to move between a deformed state and a free state, and the flex gear is in the free state when the wave generator is in a retracted condition.

19. The method according to claim 15, wherein the variable geometry adjustment interface is operable to adjust a flow path geometry axially downstream of a combustor of the engine in response to rotation of the output ring gear.

20. The method according to claim 19, wherein the drive shaft and the position feedback shaft extend radially to align the gear interface of the electric actuator with the variable geometry adjustment interface.

* * * * *